United States Patent [19]

Bolland

[11] Patent Number: 4,679,425
[45] Date of Patent: Jul. 14, 1987

[54] LIQUID STORAGE TANK LEAK DETECTION SYSTEM

[75] Inventor: Daniel B. Bolland, Convent Station, N.J.

[73] Assignee: Exxon Research and Engineering Company, Florham Park, N.J.

[21] Appl. No.: 804,861

[22] Filed: Dec. 5, 1985

[51] Int. Cl.⁴ .............................................. G01F 23/02
[52] U.S. Cl. ...................................... 73/49.2; 73/323
[58] Field of Search ............... 73/292, 323, 49.2, 49.3, 73/40, 290; 374/142, 4, 43

[56] References Cited

U.S. PATENT DOCUMENTS

| | | | |
|---|---|---|---|
| Re. 31,884 | 5/1985 | Hansel et al. | 73/49.2 |
| 1,598,571 | 8/1926 | Fox et al. | 73/302 |
| 1,706,336 | 3/1929 | Whitney | 73/323 |
| 2,842,089 | 7/1958 | Midkiff | 73/323 |
| 3,538,746 | 11/1970 | Jacobs et al. | 73/49.2 |
| 3,580,055 | 5/1971 | White | 73/49.2 |
| 3,841,146 | 10/1974 | Cross et al. | 73/49.2 |
| 4,386,525 | 6/1983 | Mooney | 73/49.2 |
| 4,571,987 | 2/1986 | Horner | 73/49.2 |

OTHER PUBLICATIONS

John A. Ainlay, Tank Leak Tester, PEI Conference, Las Vegas, 1983.

*Primary Examiner*—Michael J. Tokar
*Assistant Examiner*—Hezron E. Williams
*Attorney, Agent, or Firm*—Joseph J. Dvorak

[57] ABSTRACT

The sensing device includes a first vertical tube having a length substantially equal to the diameter of the tank being tested and which is sealed at the bottom and has connected at the top, a smaller diameter second tube adapted to be positioned vertically for measurement of the height or level of liquid within the tube when the sensing device is charged with liquid under conditions of use. Importantly, the diameter, d, of the smaller diameter second tube of the sensor must be such that when the sensor and tank are filled with the same fluid to the same height any change in the heights of the fluid in the sensor and tank resulting from a change in temperature in the tank fluid will be proportional to one another and preferably will be equal. The device of the present invention preferably includes means for determining the height of fluid in the sensor and the tank at any given time.

12 Claims, 5 Drawing Figures

LIQUID STORAGE TANK LEAK DETECTION SYSTEM

FIELD OF THE INVENTION

The present invention relates to a method and apparatus for determining the rate of leakage of fluid from a storage tank. It is particularly concerned with determining the leakage of petroleum products from underground storage tanks, such as gasoline storage tanks used in gasoline stations and the like. It will be appreciated, however, that the apparatus and method disclosed herein are suitable for testing the leakage, if any, from many types of fluid enclosures and tanks. Thus, the invention should not be considered limited to underground fuel tanks. For matters of convenience, however, the invention will be described in relation to underground fuel storage tanks.

BACKGROUND OF THE INVENTION

In the United States alone, there are estimated to be about 3 million underground petroleum storage tanks, about 1 million in gasoline service and about 2 million in fuel oil service. In addition to the tanks in gasoline and fuel oil service, there are an unknown number of underground storage tanks storing other petroleum materials. It is estimated that about 31% of the total underground storage tank population are 20 years old or older. Consequently, the risk of corrosion failure of such a large number of tanks is significant. Undetected leaks, of course, present not only an economic loss, but also a threat to the environment. Thus, it is essential that such leaks be detected as soon as possible so that the tanks can be replaced or repaired. Indeed, current industry standards require that any detector employed in tank leak testing be capable of detecting leaks of the order of 0.05 gallons per hour. This capability is not easily or inexpensively achieved. As is known in the art, the temperature of a fluid in an underground tank, for example, can change continually at a rate of up to about 0.01° F. per hour. Temperature changes of this magnitude will cause volume changes of up to 0.06 gallons per hour in a 10,000 gallon gasoline tank. Consequently, a slight change in temperature of the tank fluid produces a volume change which is greater than the amount of leakage which is sought to be detected. Therefore, leak detecting systems employ elaborate temperature measurement systems in addition to tank content level measurement systems. In that regard, see, for example, U.S. Pat. No. 3,538,746; U.S. Pat. No. 3,580,055; U.S. Pat. No. 3,841,146 and U.S. Pat. No. Re. 31,884, each of which describe leak detectors designed to measure and/or compensate for temperature changes of tank fluids. The deficiencies of each of these detectors should be readily apparent.

The detector of U.S. Pat. No. 3,538,746 is based on measuring the difference in pressure between the tank fluid and a filled reference leg in a partially filled tank. Presently available differential pressure sensors capable of being inserted through a tank fill pipe, however, are not sufficiently accurate to detect leaks of 0.05 gals/hr. within a reasonable time. Additionally evaporation and condensation effects will mask this systems leak detection capabilities.

The detector of U.S. Pat. No. 3,580,055 requires circulating fluid in the tank to an external temperature sensor in an attempt to thermally equilibrate the liquid and make a temperature correction in determining whether a leak exists. The need for a skilled operator is particularly important with this device. Raising the liquid hydrostatic head above ground level causes significant tank bulging which can mask the volume change due to a leak.

The devices of U.S. Pat. No. 3,841,146 and U.S. Pat. No. Re. 31,884 require elaborate and relatively expensive electronic circuitry in order to measure weight or mass changes to determine tank leakage.

Thus there remains a need for a new and improved tank leak detector which is sufficiently sensitive so as to be able to accurately detect leaks of the order of 0.05 gallons per hour and less in underground tanks having a volume, for example, of from 5,000 to 10,000 gallons or more and which is relatively inexpensive and simple to operate.

SUMMARY OF THE INVENTION

The apparatus of the present invention comprises a sensing device adapted to be inserted into a storage tank fill pipe. In its simplest sense, the sensing device includes a vertical tube having a length substantially equal to the diameter of the tank being tested and which is sealed at the bottom and has connected at the top, a smaller diameter tube adapted to be positioned vertically for measurement of the level of liquid within the tube when the sensing device is charged with liquid under conditions of use. Importantly, the diameter, d, of the smaller diameter tube of the sensor must be such that when the sensor and tank are filled with the same fluid to the same height any change in the heights of the fluid in the sensor and tank resulting from a change in temperature in the tank fluid will be proportional to one another and preferably will be equal. The device of the present invention preferably includes means for determining the height of fluid in the smaller diameter tube of the sensor and the fill pipe of the tank at any given time.

In operation, the tank to be tested is filled to a predetermined level within the fill pipe. The sensor is also filled with the same liquid as is in the tank and is lowered through the tank fill pipe. The fill pipe liquid level and/or the liquid level in the sensor is adjusted so that the level of liquid in the fill pipe and in the sensor are equal. Since any temperature changes in the liquid in the tank will produce proportional and preferably equal changes in the level in the fill pipe and in the sensor, any deviation from proportional or equivalent changes in the liquid levels is a measure of a leak in the tank.

DETAILED DESCRIPTION OF THE INVENTION

Figure 1:
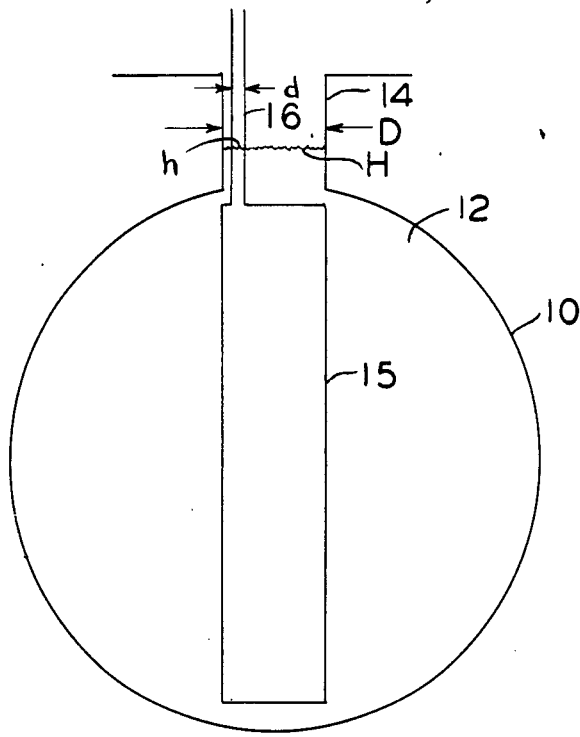
FIG. 1 is a schematic diagram illustrating the sensor of the present invention placed within a tank for leak testing.

Referring first to FIG. 1, an underground storage tank 10 is shown having liquid 12 therein filled to a predetermined level, H, within the fill pipe 14. As can be seen from FIG. 1, the sensor of the present invention is adapted to be inserted within fuel tank 10 and includes a vertical tube 15 sealed at its bottom and a smaller diameter tube 16 connected at its top. As can be seen, the length of tube 15 is substantially equal to the diameter of the storage tank 10. Also, the vertical tube 15 of the sensor is sized so as to just fit through the fill pipe 14. The smaller diameter tube 16 extending upwardly from tube 15 is adapted to be vertically positioned within the fill pipe 14 and is of a length sufficient to extend above any liquid level within the fill pipe under conditions of use. Preferably the smaller diameter tube 16 has a length at least substantially equal to the length of the fill tube. For efficient heat transfer between the contents of the tank and the contents of the sensor tube 15 is made of a heat conducting material such as copper. For ease of viewing the level of fluid in smaller diameter tube 16, it is made of glass. Also, as shown, the smaller diameter tube 16 is filled to a height, h, preferably with the same liquid as in the tank and which level or height, h, is substantially the same as the level, H, in the fill pipe. Importantly, the diameter, d, of tube 16 is such when the sensor and the tank are filled with the same fluid and to substantially the same height any change in height thereafter of the fluid in the tank and in the sensor resulting from a change in temperature will be proportional to one another and preferably will be equal. In this way, any deviation from a proportional or equal height change of liquid levels will reflect leakage from the tank.

To further illustrate the principle of the operation of the device of the present invention consider a change in tank contents temperature of $\Delta T$. Given a coefficient of expansion, $\alpha$, of the tank contents, the tank contents volume, V, will change by $V\alpha\Delta T$. If the diameter of the fill pipe is D, then the liquid level in the fill pipe will change by a height, $\Delta H$, such that $$\Delta H = \frac{4V\alpha\Delta T}{\pi D^2}$$

A similar change will be experienced by the volume, v, of liquid in the sensor. If the diameter of the smaller tube 16 is d, then the liquid level will change by a height, $\Delta h$, such that $$\Delta h = \frac{4v\alpha\Delta T}{\pi d^2}$$

From the foregoing, the ratio of $\Delta H/\Delta h$ for a given temperature change, $\Delta T$, reduces to $$\frac{\Delta H}{\Delta h} = \frac{Vd^2}{vD^2}$$

The values v, V, d and D are fixed and therefore the ratio of the change in height of the liquid in the sensor and fill tube is constant for any change in temperature, i.e., $\Delta H/\Delta h$ = constant.

Since leaks in the tank affect the fill pipe height only, deviations from this proportional relationship between H and h indicates a leaking tank. In a non-leaking tank a plot of $\Delta h$ versus $\Delta H$ over time will be a straight line with a slope, $Vd^2/vD^2$ whereas deviations from a straight line indicate the tank is leaking, the difference from the actual value of H and the value calculated from $H = Vd^2/vD^2 \times h$, being a measure of the leak in the elapsed time.

In a preferred embodiment of the present invention, the diameter, d, is of a predetermined diameter such that the change in height of liquid level in the sensor tube 16 and in the fill tube 14 as a result of a change in temperature of the tank contents will be equal.

Having described the principle of operation of the present invention, reference is now made to one specific embodiment of the device of the invention and particularly to the means for measuring the level of fluid in the sensor and in the tank. As may be expected, a number of different means may be employed to determine the level of liquid within the smaller diameter tube 16 of the sensor and the fill pipe 14. In the embodiment shown in FIG. 2, for example, visual inspection is employed. In this particular embodiment of the invention, a boroscope 20 is adjustably and movably mounted on the top portion 22 of a tripod positioned over the fill pipe 14. A pair of rigid standards, 23, are fixed to the sensor 15 by a suitable bracket, 24. A horizontal bar 40 rests on top of the fill pipe 14 and has a pair of adjustor means 25, such as set screws, for maintaining standards 23 in the desired position. The smaller diameter tube 16 of the sensor device is mounted on the inside of a standard 23 by means of clips 41. Tube 16 is in communication with and connected to tube 15 of the sensor via a flexible piece of tubing 17. Means for shining a light within the fill tube is provided, in this instance, via the boroscope 20. Light to boroscope 20 is supplied in the form of a flexible fiber optic material 26 connected to a light source (not shown). The boroscope 20 is provided with a fixed pointer 27 which is aligned with a scale 28 mounted on frame 22. Means 29, such as a rack and pinion mechanism i provided for raising and lowering the boroscope 20, as necessary, to visual determine the level of the liquid, h, within the smaller diameter tube 16 of the sensor and the level, H, in the tank fill pipe 14. Guide piece 21 maintains boroscope 20 in a vertical position.

Figure 2:
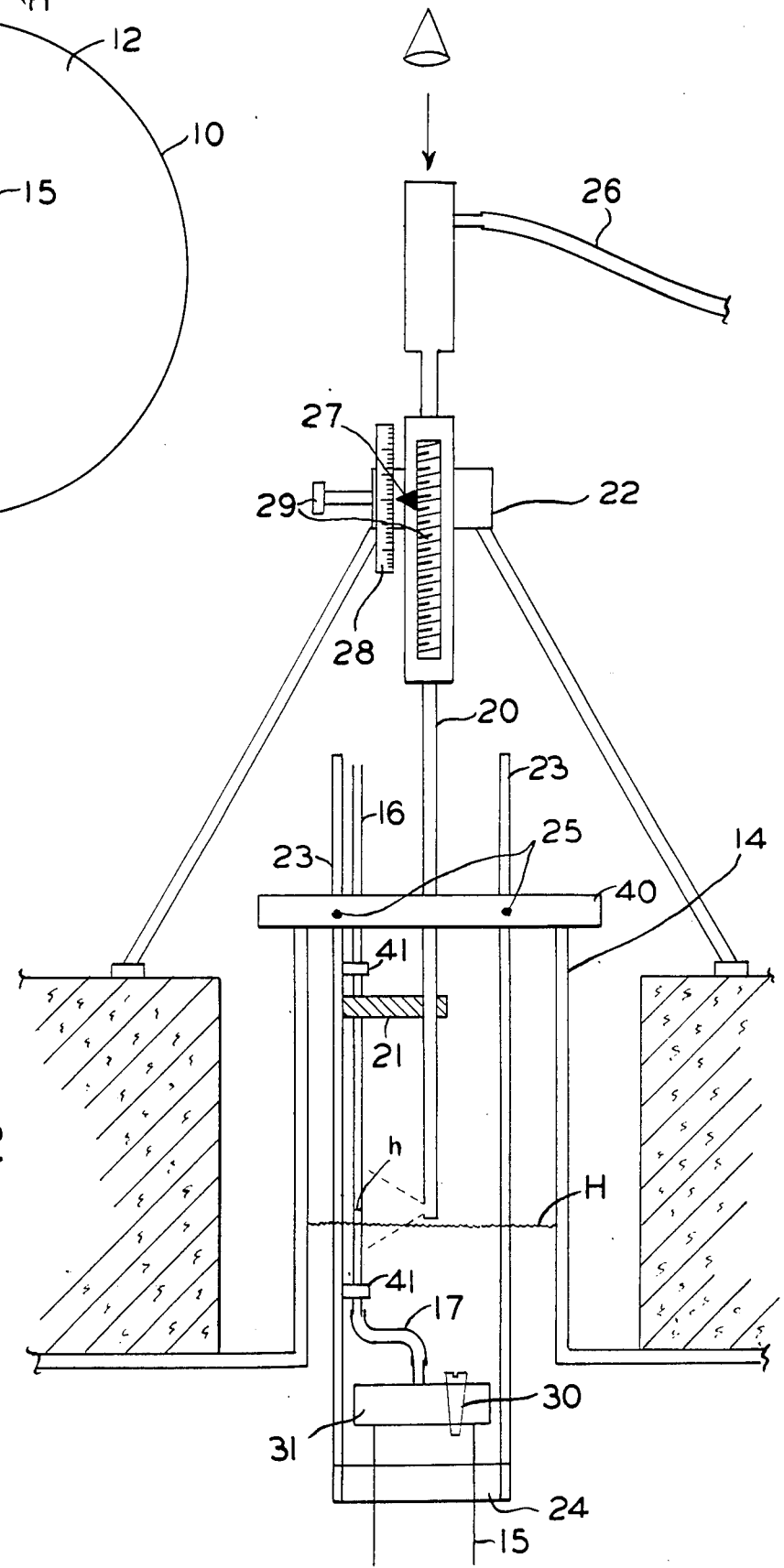
FIG. 2 is a schematic diagram showing one particular means of determining the level of liquid in a fill pipe of a tank and a sensor in accordance with the practice of the present invention.

In the embodiment shown in FIG. 2, the tube 15 of the sensor is fitted at the top with a valve 30 in top 31. In its open position, valve 30 will permit communication between the interior of the tube and the tank. Thus, valve 30 can be used for adjusting the liquid levels so that at the start of a test the liquid within the sensor is of the same level as the liquid within the fill pipe 14.

Figure 3:
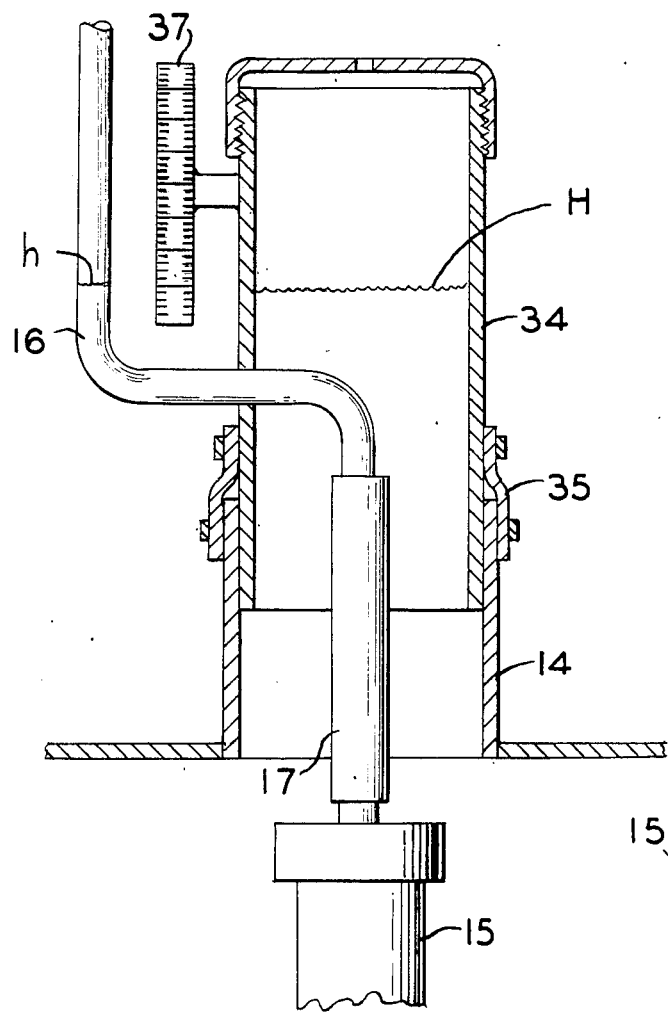
FIG. 3 is a schematic diagram of yet another embodiment of the present invention.

An alternate means for determining the liquid level in the smaller diameter tube 16 of the sensor and the level in the fill pipe 14 is shown in FIG. 3. In this embodiment, smaller diameter tube 16 is located adjacent an extension 34 of fill pipe 14. Sealing means 35 prevent loss of fluid through the connection of the extension 34 and fill pipe 14. Extension 34 is made of transparent material, such as, for example, glass or clear plastic. A scale 39 is conveniently positioned for noting the fluid levels, h and H, in tubes 16 and 34, respectively. As shown tube 16 is operably connected to tube 15 via a flexible tubing 17. As will be readily appreciated this embodiment is suited to partially buried tanks or to applications where the fill pipe is raised above ground.

Figure 4:
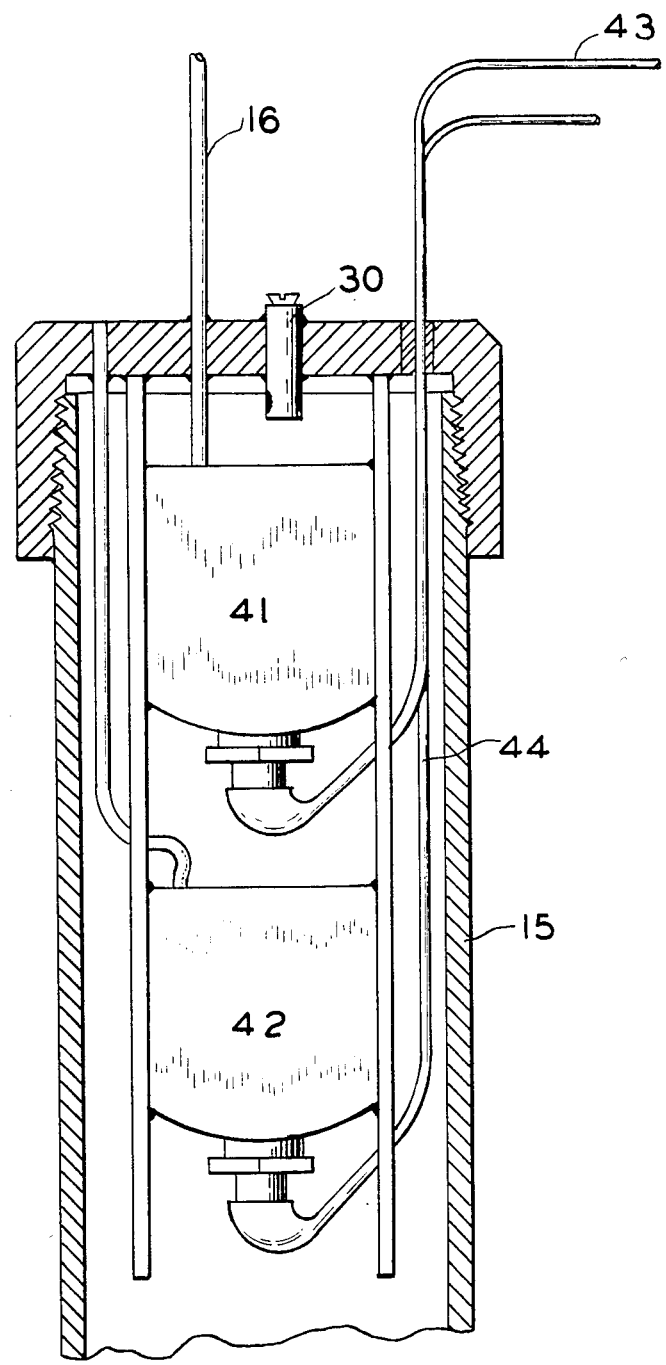
FIG. 4 is a schematic diagram of a device of the present invention which utilizes pressure sensing means to measure the height of fluid in the sensor and tank fill pipe in accordance with the invention.

In the embodiment shown in FIG. 4, pressure sensors 41 and 42 are employed to measure the level or height of fluid in the smaller diameter tube 16 of the sensor and in the fill pipe 14, respectively. These sensors are connected, of course, by cables 43 and 44, respectively, to a suitable instrumentation system (not shown). Indeed, such a system might include microprocessor means for computing the change in liquid levels and comparing them to a standard thereby providing a direct indicator of a leak condition in the tank.

Figure 5:
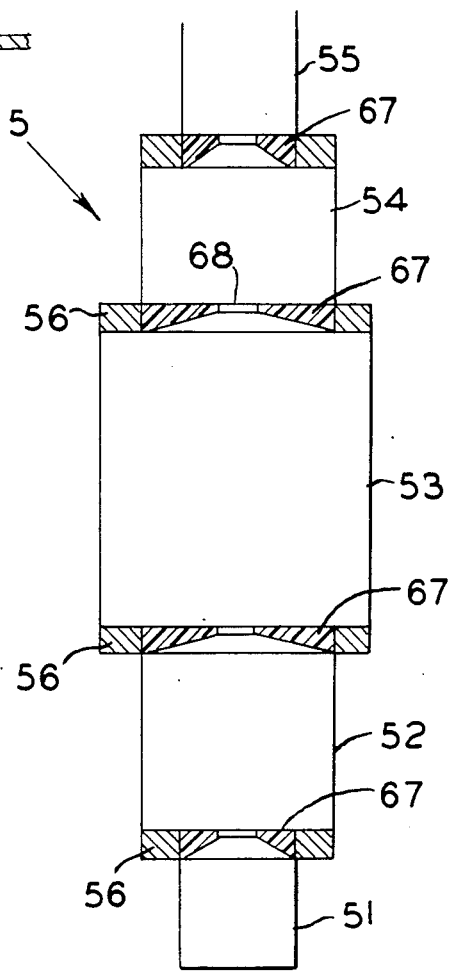
FIG. 5 is a schematic diagram of an alternate and preferred embodiment of a portion of the sensor of the present invention.

In the alternate embodiment of the present invention shown in FIG. 5, the tube 15 comprises at least 3 tubular sections, each with a predetermined volume such that the ratio of the internal volume of a given section to its surrounding annular ring of tank volume is substantially equal to such ratio for other sections. This embodiment is particularly suitable to those situations in which there is a stratification of the tank fluid temperature. As is shown then in FIG. 5, tube 15 has 5 sections, 51, 52, 53, 54, and 55, respectively, and each section has a volume such that the ratio of one sensor section volume to its relevant surrounding tank volume is substantially equal to the ratio of another sensor section volume to its surrounding tank volume.

Also, as is shown in FIG. 5, each section preferably is bonded to but thermally insulated from the adjacent section by means of non-conductive sealant means 56, such as epoxy cement.

In yet another embodiment, also shown in FIG. 5, the internal volume of each succeeding sensor section is further substantially thermally insulated from the preceeding internal volume by a horizontally disposed insulating barrier 67 which has a central aperture 68.

To further illustrate the present invention, reference is now made to the following example.

EXAMPLE

A 550 gallon above ground tank having three fill pipes was employed using number 2 fuel oil. One fill pipe was fitted with a fill pipe extension and sensor similar to that shown in FIG. 3. The other two fill pipes were fitted solely with extensions. In this way the tank simulated the typical total cross-sectional area of fill and other tubes on an actual underground tank. With the tank as equipped, a leak of 0.05 gallons corresponded to a change of about 1 cm (0.4 inch) in height in the fill pipe extension. Thus, the fill pipe level change due to a leak would be about the same for the test tank as it would be for an underground tank.

The average temperature change per hour during the test was about 0.5° F. Thus, for the tank volume the temperature induced volume changes in the above ground test tank are more than twice as severe as would be expected in an underground tank. For an equivalent temperature induced volume change of a 10,000 gallon underground tank, a temperature change of about 0.025° F./hr. would be required. The level of the liquid in the smaller diameter sensor tube and the fill pipe extension were equal at the start of the test. Thereafter liquid was removed at a known rate so as to simulate a leak and the levels of fluid in the extension piece and in the smaller diameter tube were again measured to determine the leak rate. This procedure was repeated with the results shown in Table I below.

TABLE I

| Run No. | Ave. Leak Rate, gal/hr. | |
| --- | --- | --- |
|  | Measured | Actual |
| 1 | .036 | .034 |
| 2 | .056 | .061 |
| 3 | .009 | .012 |

TABLE I-continued

| Run No. | Ave. Leak Rate, gal/hr. | |
| --- | --- | --- |
|  | Measured | Actual |
| 4 | .034 | .035 |

From the foregoing, it can be seen that the device of the present invention is accurate in detecting leak rates of about 0.03 gals/hr or higher. Also, at lower leak rates the device is still capable of detecting the leak although it may be less accurate in field conditions.

What is claimed is:

1. An apparatus for determining whether fluid is leaking from a fluid storage tank having a fill pipe, said apparatus comprising:
    a first vertical tube adapted to be inserted into the tank being tested via the fill pipe and having a length substantially equal to the diameter of said tank, said tube being sealed at the bottom;
    a second tube adapted to be vertically positioned under conditons of use of said apparatus, said second tube having a predetermined diameter;
    means for connecting said second tube to the top of said first tube whereby said first and second tube define a fluid container;
    means for filling said first and second tube with fluid to a predetermined level in said second tube;
    said second tube having a diameter relative to the diameter of the fill pipe such that any change in the level of fluid in said second tube and said fill pipe resulting from a change in temperature of the fluids therein are proportional; and
    means for determining any deviation from a proportional change in the fluid level in the second tube and fill pipe whereby any such deviation is indicative of a leak of fluid from said tank.

2. The apparatus of claim 1 wherein said second tube is adapted to be vertically positioned within said fill pipe.

3. The apparatus of claim 1 including a transparent cylinder of substantially the same diameter of said fill pipe and adapted to be placed in sealing engagement therewith so as to extend the length of said fill pipe and wherein said second tube is adapted to be vertically positioned adjacent said transparent cylinder.

4. The apparatus of claim 1 wherein said second tube has a diameter relative to the diameter of the fill pipe such that any change in the level of fluid in said second tube and said fill pipe resulting from a change in temperature of the fluids therein are substantially equal.

5. The apparatus of claim 1 wherein said first tube consists of at least three sections, a top section, a bottom section and a middle section, each section when said apparatus is inserted in a tank under conditions of use being surrounded by an annular ring of tank volume, the ratio of the volume of any section to the volume of its surrounding tank volume being substantially equal to such ratio for any other section.

6. The apparatus of claim 5 wherein said sections are thermally insulated from each other.

7. The apparatus of claim 1 wherein said means for filling said first and second tube with fluid includes a valve positioned in said apparatus so as to be below the level of fluid when said tank is filled to a predetermined level within the fill pipe.

8. The apparatus of claim 1 wherein said second tube is transparent and said means for measuring the level of fluid in said second tube and the fill pipe includes a boroscope, adapted to be inserted in said fill pipe and adjustably arranged for visual inspection of the fluid levels in said second tube and said fill pipe.

9. The apparatus of claim 8 including scale means for demarcating the level of fluid in said second tube and said fill pipe.

10. The apparatus of claim 1 wherein said means for measuring the levels of fluid in said second tube and said fill pipe includes pressure sensors.

11. A method of detecting a leak in a tank having a fill pipe comprising:

inserting a sensing device in said tank which has a first vertical tubular portion that extends for substantially the entire diameter of the tank and a second tubular portion that extends for a predetermined length of the fill pipe of the tank, said sensing device being capable of being filled with a fluid, said second tubular portion having a diameter relative to the diameter of the fill pipe such that any change in the level of fluid in said second tube and said fill pipe resulting from a change in temperature of the fluids therein are proportional to one another;

filling the sensing device with the same fluid as is in said tank and to substantially the same level as the level of fluid in the fill pipe;

determining any deviation from a proportional change in the level of fluid in said sensing device and in said fill pipe whereby said deviation indicates said tank is leaking.

12. The method of claim 11 wherein said second tubular portion has a diameter relative to the diameter of the fill pipe such that any change in the level of the fluid in said second tube and said fill pipe resulting from a change in temperature of the fluids therein are substantially equal.

* * * * *